United States Patent
Li et al.

(10) Patent No.: US 12,196,841 B2
(45) Date of Patent: Jan. 14, 2025

(54) GHOST OBJECT IDENTIFICATION FOR AUTOMOBILE RADAR TRACKING

(71) Applicant: Continental Automotive Systems, Inc., Auburn Hills, MI (US)

(72) Inventors: Pengbo Li, Auburn Hills, MI (US); Okechukwu Sidney Igbokwe, Rochester Hills, MI (US); Kyle Kolasinski, Howell, MI (US); Kirk North, Kingsville (CA); Adam Gagorik, Royal Oak, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 338 days.

(21) Appl. No.: 17/594,278

(22) PCT Filed: Apr. 8, 2020

(86) PCT No.: PCT/US2020/027202
§ 371 (c)(1),
(2) Date: Oct. 8, 2021

(87) PCT Pub. No.: WO2020/210307
PCT Pub. Date: Oct. 15, 2020

(65) Prior Publication Data
US 2022/0163649 A1 May 26, 2022

Related U.S. Application Data

(60) Provisional application No. 62/830,971, filed on Apr. 8, 2019.

(51) Int. Cl.
*G01S 13/06* (2006.01)
*G01S 7/35* (2006.01)
*G01S 13/931* (2020.01)

(52) U.S. Cl.
CPC .............. *G01S 13/06* (2013.01); *G01S 7/354* (2013.01); *G01S 13/931* (2013.01)

(58) Field of Classification Search
CPC ......... G01S 7/354; G01S 13/06; G01S 13/931
See application file for complete search history.

(56) References Cited

U.S. PATENT DOCUMENTS

| 4,970,518 A | 11/1990 | Cole, Jr. |
| 5,877,721 A | 3/1999 | Tsang et al. |

(Continued)

FOREIGN PATENT DOCUMENTS

| CN | 106043297 A | 10/2016 |
| CN | 107037432 A | 8/2017 |

(Continued)

OTHER PUBLICATIONS

Notice of Reasons for Refusal drafted Mar. 31, 2023, for the counterpart Japanese Patent Application No. 2021-559662.

(Continued)

*Primary Examiner* — Vladimir Magloire
*Assistant Examiner* — Maxine McKenzie Phillips

(57) ABSTRACT

Ghost Object Identification For Automobile Radar Tracking A method of classifying an object detected by a radar device (R) includes identifying two dynamic objects (O) and one stationary object from sensor data detected by at least one sensor; determining a plurality of confidences based on a comparison of the separation distance between each object and a range of each object to the sensor. The method also determining a highest confidence value among them; comparing the highest confidence to a p re-defined threshold; and increasing a corresponding ghost probability, when the highest confidence value is higher than a predetermined threshold or decreasing the corresponding ghost probability, when the highest confidence value is not higher than the (Continued)

predetermined threshold. The method also includes marking the object as a ghost object when a probability of a less confident object is higher than an upper threshold and setting a ghost probability to zero when the less confident object is lower than a lower threshold.

2 Claims, 9 Drawing Sheets

(56) References Cited

U.S. PATENT DOCUMENTS

| | | |
|---|---|---|
| 2009/0033549 A1 | 2/2009 | Jin et al. |
| 2013/0314272 A1 | 11/2013 | Gross et al. |
| 2014/0368375 A1 | 12/2014 | Baftiu et al. |
| 2016/0161605 A1* | 6/2016 | Liu .................. G01S 13/66 342/59 |
| 2016/0209211 A1* | 7/2016 | Song ................. G01S 7/4972 |
| 2017/0031013 A1 | 2/2017 | Halbert et al. |
| 2017/0261602 A1 | 9/2017 | Olshansky et al. |
| 2018/0292506 A1 | 10/2018 | Bjorkengren |
| 2018/0341012 A1 | 11/2018 | Takada |
| 2019/0084566 A1* | 3/2019 | Park .................. G05D 1/0287 |
| 2020/0018821 A1 | 1/2020 | Matsuo et al. |

FOREIGN PATENT DOCUMENTS

| | | | |
|---|---|---|---|
| CN | 107132531 A | 9/2017 | |
| CN | 109559525 A | 4/2019 | |
| DE | 102004058844 A1 | 6/2006 | |
| DE | 102012108023 A1 | 5/2014 | |
| DE | 102016215505 A1 | 2/2018 | |
| EP | 1418444 A1 * | 5/2004 | ........... G01S 13/931 |
| EP | 3299841 A1 | 3/2018 | |
| GB | 1231794 A | 5/1971 | |
| JP | H11328600 A | 11/1999 | |
| JP | 2005257515 A | 9/2005 | |
| JP | 2006242695 A | 9/2006 | |
| JP | 2009074804 A | 4/2009 | |
| JP | 2015105836 A | 6/2015 | |
| JP | 2016148547 A | 8/2016 | |
| JP | 2017096840 A | 6/2017 | |
| JP | 2018200173 A | 12/2018 | |
| KR | 20170140005 A | 12/2017 | |
| WO | 2007094064 A1 | 8/2007 | |
| WO | 2018142629 A1 | 8/2018 | |

OTHER PUBLICATIONS

Notice of Reasons for Refusal drafted Sep. 11, 2023, for the counterpart Japanese Patent Application No. 2021-559662.
International Search Report and the Written Opinion of the International Searching Authority mailed on Jul. 16, 2020 for the counterpart PCT Application No. PCT/US2020/027202.
Notice of Reasons for Refusal dated Oct. 14, 2022 for the counterpart Japanese Patent Application No. 2021-559662.
Hyun Et El. "Moving and Stationary Target Detection Scheme using Coherent Integration and Subtraction for Automotive FMCW Radar Systems", 2017 IEEE Radar Conference (RadarConf), May 8-12, 2017, pp. 476-481, IEEE.
Office Action dated Mar. 28, 2024 from corresponding Chinese patent application No. 202080027137.X.

* cited by examiner

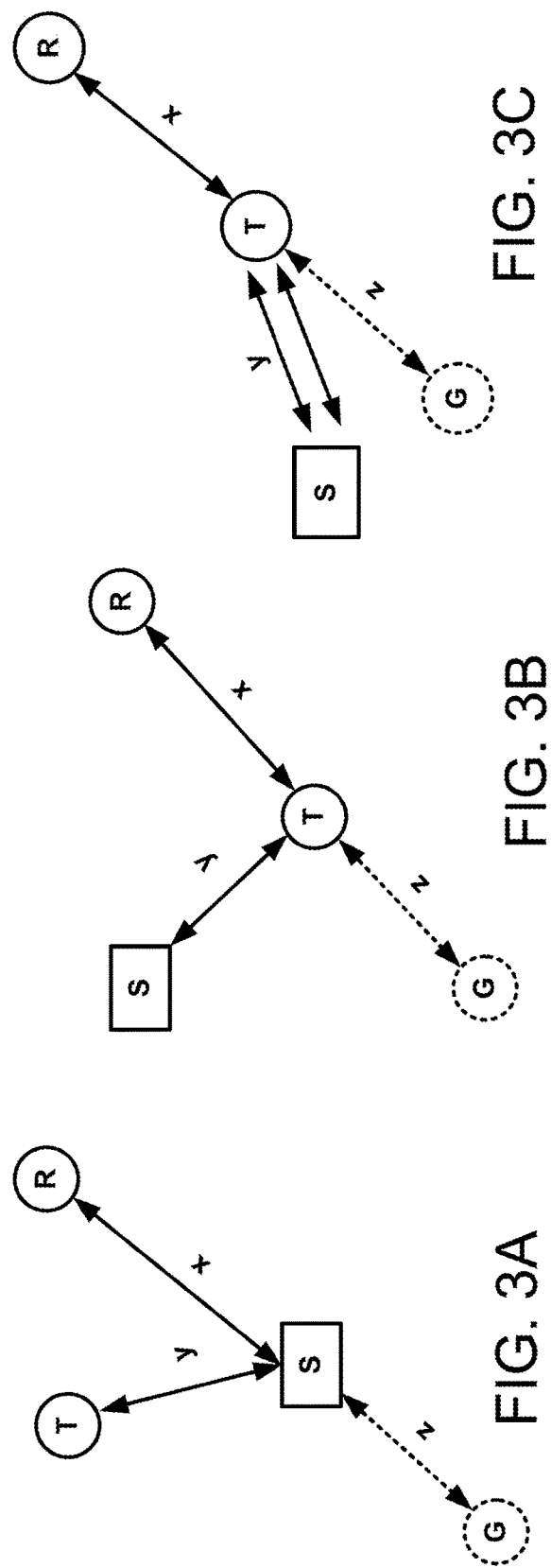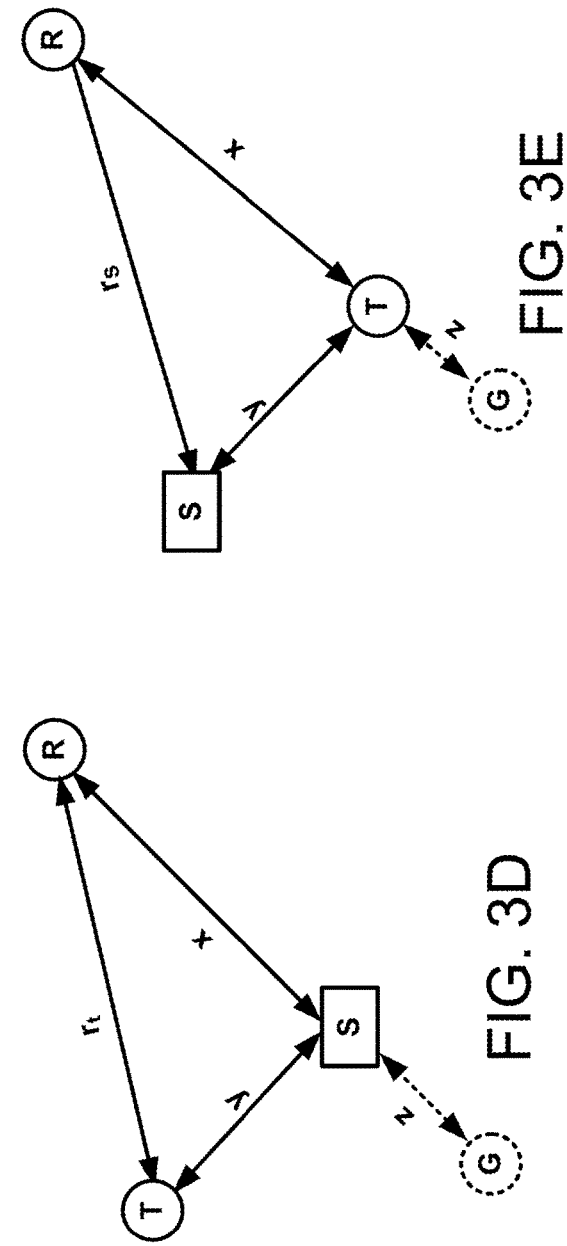
FIG. 3A
FIG. 3B
FIG. 3C
FIG. 3D
FIG. 3E

GHOST OBJECT IDENTIFICATION FOR AUTOMOBILE RADAR TRACKING

TECHNICAL FIELD

This disclosure relates to a system and a method for detecting objecting proximate to an automotive vehicle, with a radar device, for example, detecting objects approaching a vehicle.

BACKGROUND

Traffic on roads includes traffic participants, such as, but not limited to, vehicles, streetcars, buses, pedestrians, and any other moving object using public roads and walkways or stationary objects such as benches and trash cans. Organized traffic generally has well established priorities, lanes, right-of-way, and traffic control intersections. Traffic may be classified by type: heavy motor vehicle (e.g., car and truck), other vehicles (e.g., moped and bicycle), and pedestrian. It is desirable to have a system and method for monitoring the traffic to detecting driving along roadways.

Radar is widely used in automobile industry to detect vehicles, pedestrians, road boundaries, and other objects, etc. These targets are in close range, e.g. typically less than 500 meters. There may be strong reflective surfaces and targets in the vicinity of the vehicle resulting in the detection of ghost objects. The ghost objects detected by the radar complicate detecting by the radar device as the radar device must distinguish between the actual objects and the ghost objects.

There are almost always ghost objects in radar detected objects from multipath reflections, especially in city areas. In some devices, road objects and ghost area are used to assist in identifying ghost objects. In other devices, objects speed, range and an adjacent object are used to identify ghost object. In other devices, range of real target, ghost target and candidate reflector are used to identify ghost objects in aircraft tracking. Additionally, in other devices, range and azimuth are used to identify ghost objects for aircraft tracking.

However, these approaches are application-specified and lacking a general solution. Some approaches only deal with one type among several multipath reflection cases and could not be used in other scenarios. For example, some devices depend on road object and assumes the ghost object detects later than the real target, which is not always true. Other devices only deal with the simplest multipath reflection scenario. Additionally, in other devices disclosed in some prior art, discuss some other reflection configurations, but the method is not suitable for automobile radar application and there are chances to identify real object as ghost objects since there are more targets in automobile radar tracking than that in air craft control application. Moreover, the approach adopted in these examples are not uniform and hard to be integrated to automobile radar system.

Therefore, it is desirable to have a system and method for detecting ghost objects that provides a multipath reflection solution for automobile radar object tracking and detection.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One general aspect includes a method classifying an object detected by a radar device. The method also includes receiving, at a hardware processor, sensor data from at least one sensor in communication with the hardware processor and positioned such that an area surrounding the radar device is within a field of view of the at least one sensor.

The method may also include detecting one or more objects in the area from the sensor data.

The method may also include identifying, at the hardware processor, two dynamic objects and one stationary object from the one or more objects.

The method may also include determining a plurality of confidences based on a comparison of the separation distance between each object and a range of each object to the sensor.

The method may also include comparing, at the hardware processor, the plurality of confidences to determine a highest confidence value among them.

The method may also include comparing the highest confidence to a pre-defined threshold.

The method may also include finding the dynamic object with less RCS or lifetime among the two dynamic objects.

The method may also include increasing a corresponding ghost probability, when the highest confidence value is higher than a predetermined threshold and decreasing the corresponding ghost probability, when the highest confidence value is not higher than the predetermined threshold.

The method may also include marking the object as a ghost object when a probability of a less confident object is higher than an upper threshold and setting a ghost probability to zero when the less confident object is lower than a lower threshold.

Implementations may include one or more of the following features. The method may include: verifying, at the hardware processor, that two objects and the sensor are colinear by checking azimuth angle.

The method may also include marking the object that is not colinear with others as the first object marking a closer one as a second object, marking a further one as a third object.

The method may also include determining, at the hardware processor, a separation distance between each object and another object and a range from the object to the sensor; and The method may also include comparing, at the hardware processor the separation distance between each object and a range of each object to the sensor.

In other embodiment, a method classifying an object detected by a radar device is. The method also includes receiving, at a hardware processor, sensor data from at least a first sensor in communication with the hardware processor and positioned such that am area surrounding the radar device is within a field of view of the at least a first sensor.

The method may also include detecting one or more objects in the area from the at least a first sensor data.

The method may also include identifying, at the hardware processor, two dynamic objects and one stationary object from the one or more objects.

The method may also include verifying, at the hardware processor, that two objects and the first sensor are colinear by checking azimuth angle.

The method may also include marking the object that is not colinear with others as a first object marking a closer one as a second object, marking a further one as a third object.

The method may also include determining, at the hardware processor, a first separation distance from the first object to the second object a first range to the first object and a second range to the second object from the first sensor.

The method may also include determining, at the hardware processor, a second separation distance from the second object to the third object, a third range to the third object.

The method may also include comparing, at the hardware processor, whether the first separation distance is equal to the second separation distance.

The method may also include obtaining a first confidence when the first separation distance is equal to the second separation distance and setting the first confidence to zero when the first separation distance is not equal to the second separation distance.

The method may also include obtaining a second confidence when the first separation distance is equal to half the second separation distance and setting the second confidence to zero when the second separation distance is not equal to half the second separation distance.

The method may also include obtaining a third confidence when the first separation distance is equal to twice the third range minus the first range and minus the second range and setting the third confidence to zero when the first separation distance is not equal to twice the third range minus the first range and minus the second range.

The method may also include comparing, at the hardware processor, the first, second and third confidence to determine the highest confidence value among them.

The method may also include comparing the highest confidence to a pre-defined threshold.

The method may also include finding the dynamic object with less RCS or lifetime among the two dynamic objects.

The method may also include increasing a corresponding ghost probability, when the highest confidence value is higher than a predetermined threshold decreasing the corresponding ghost probability, when the highest confidence value is not higher than the predetermined threshold.

The method may also include marking the object as a ghost object when a probability of a less confident object is higher than an upper threshold and setting a ghost probability to zero when the less confident object is lower than a lower threshold.

Aa vehicle system for performing a safety procedure for a vehicle based on objects in an area surrounding the vehicle is disclosed. The vehicle system may include a hardware processor.

The system may also include hardware memory in communication with the hardware processor, the hardware memory storing instructions that when executed on the hardware processor cause the hardware processor to perform operations.

This may include receiving, at the hardware processor, sensor data from at least a first sensor in communication with the hardware processor and positioned such that the area is within a field of view of the at least a first sensor.

This may also include detecting one or more objects in the area from the at least a first sensor data; identifying, at the hardware processor, two dynamic objects and one stationary object from the one or more objects.

This may also include determining a plurality of confidences based on comparisons of the separation distance between each object and a range of each object to the sensor.

This may also include comparing, at the hardware processor, the plurality of confidences to determine the highest confidence value among them.

This may also include comparing the highest confidence to a pre-defined threshold; finding the dynamic object with less RCS or lifetime among the two dynamic objects.

This may also include increasing a corresponding ghost probability, when the highest confidence value is higher than a predetermined threshold.

This may also include decreasing the corresponding ghost probability, when the highest confidence value is not higher than the predetermined threshold.

This may also include marking the object as a ghost object when the probability of the less confident object is higher than an upper threshold.

This may also include setting a ghost probability to zero when the less confident object is lower than a lower threshold.

This may also include verifying, at the hardware processor, that the two objects and the first sensor are colinear by checking azimuth angle;

This may also include marking the object that is not colinear with others as a first object marking a closer one as a second object, This may also include marking a further one as a third object.

This may also include determining, at the hardware processor, the separation distance between each object and another object and the range from the object to the first sensor.

Also, comparing, at the hardware processor the separation distance between each object and the range of each object to the sensor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

DESCRIPTION OF DRAWINGS

The present disclosure will become more fully understood from the detailed description and the accompanying drawings, wherein:

FIG. 3A is schematic view of a first ghost object detection scenario for detecting ghost objects with the blind spot monitoring system shown in FIGS. 1A-2B.

FIG. 3B is schematic view of a second ghost object detection scenario for detecting ghost objects with the blind spot monitoring system shown in FIGS. 1A-2B.

FIG. 3C is schematic view of a third ghost object detection scenario for detecting ghost objects with the blind spot monitoring system shown in FIGS. 1A-2B.

FIG. 3D is schematic view of a fourth ghost object detection scenario for detecting ghost objects with the blind spot monitoring system shown in FIGS. 1A-2B.

FIG. 3E is schematic view of a fifth ghost object detection scenario for detecting ghost objects with the blind spot monitoring system shown in FIGS. 1A-2B.

Like reference symbols in the various drawings indicate like elements.

DETAILED DESCRIPTION

Figure 1:
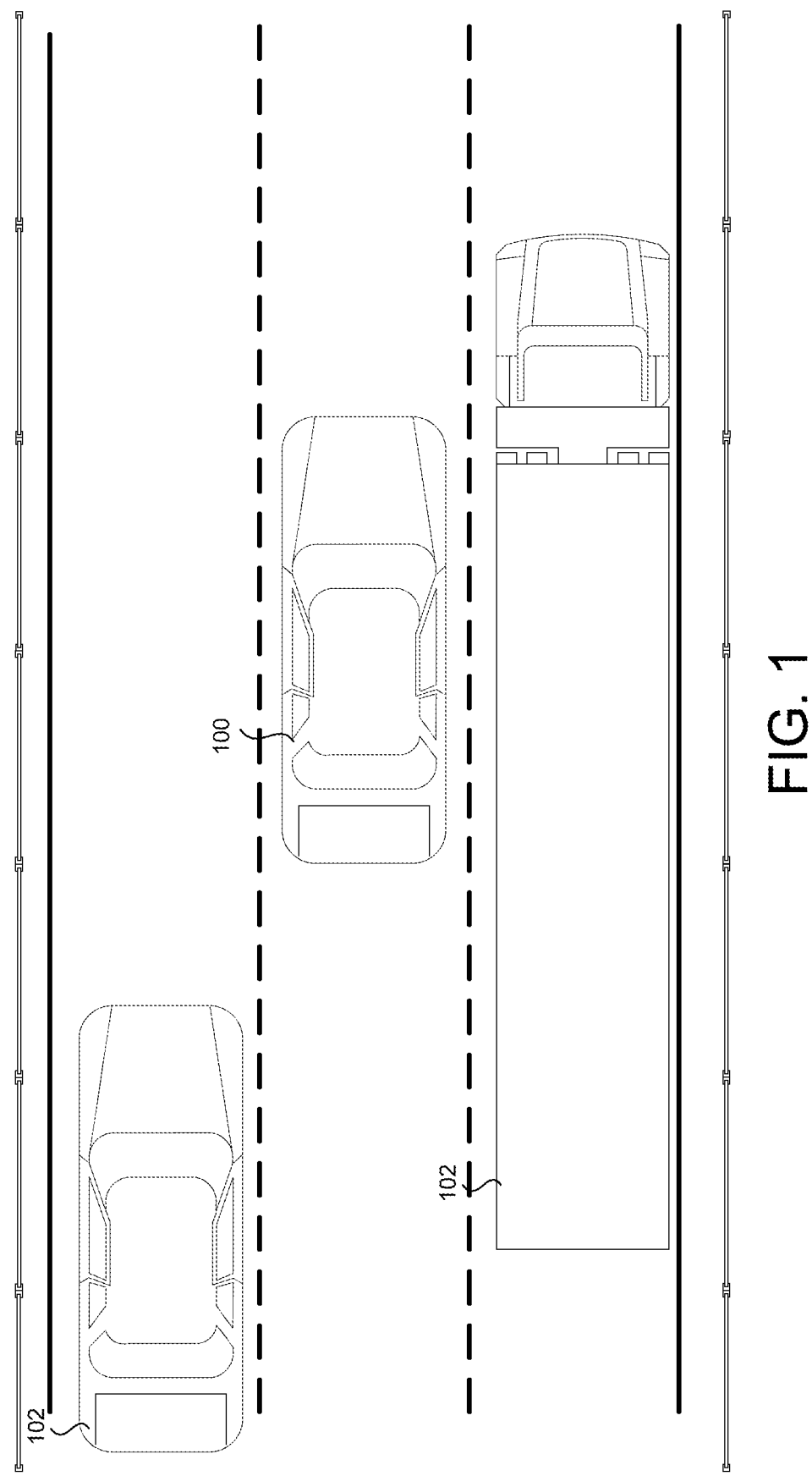
FIG. 1A is a schematic view of an exemplary overview of a vehicle having a blind spot monitoring system of the present invention in a first exemplary traffic scenario.
FIG. 1B is a schematic view of an exemplary overview of a vehicle having a blind spot monitoring system of the present invention in a second exemplary traffic scenario.
FIG. 1C is a schematic view of an exemplary overview of a vehicle having a blind spot monitoring system of the present invention in a third exemplary traffic scenario.
Figure 1B:
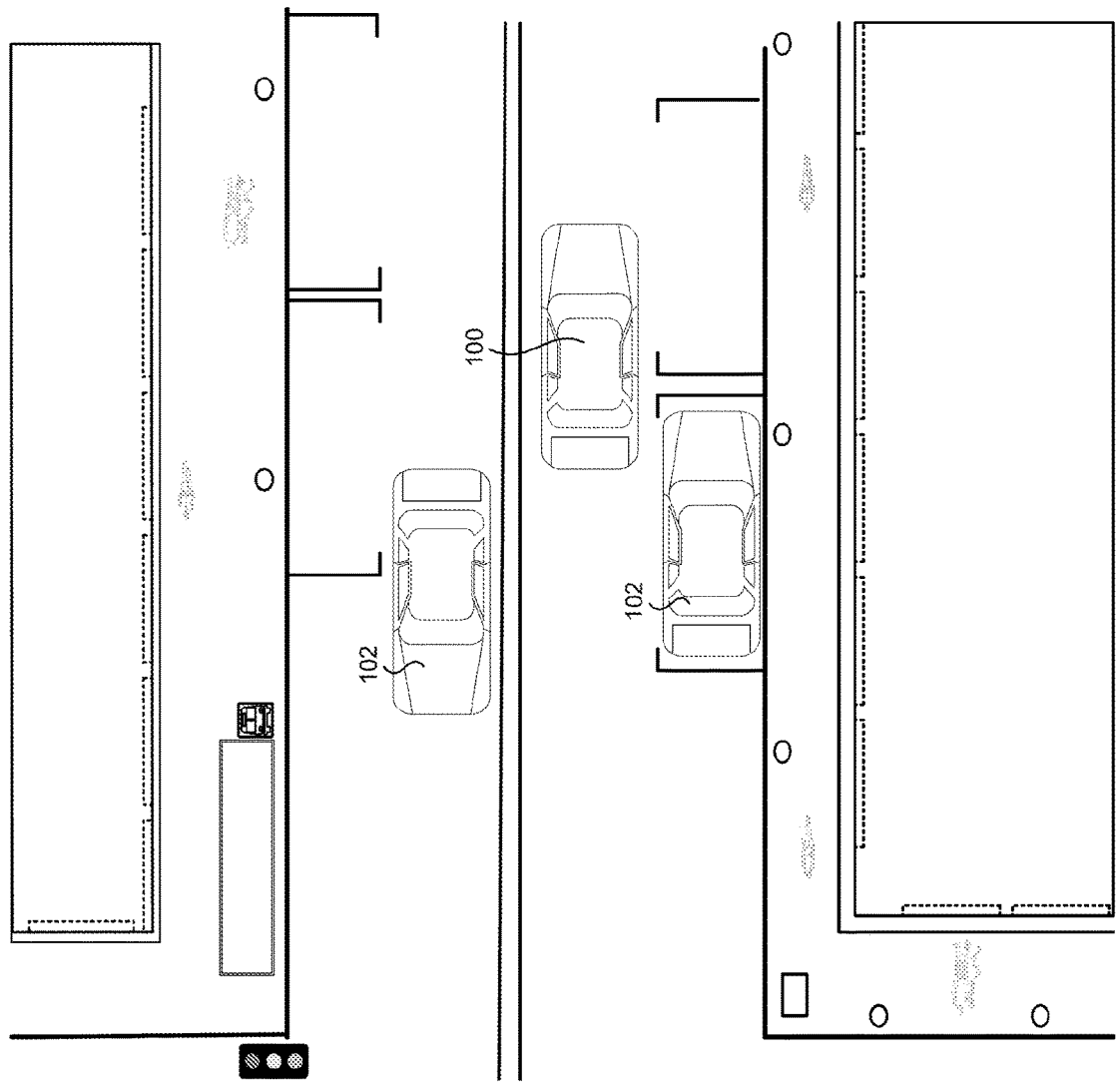
Figure 1C:
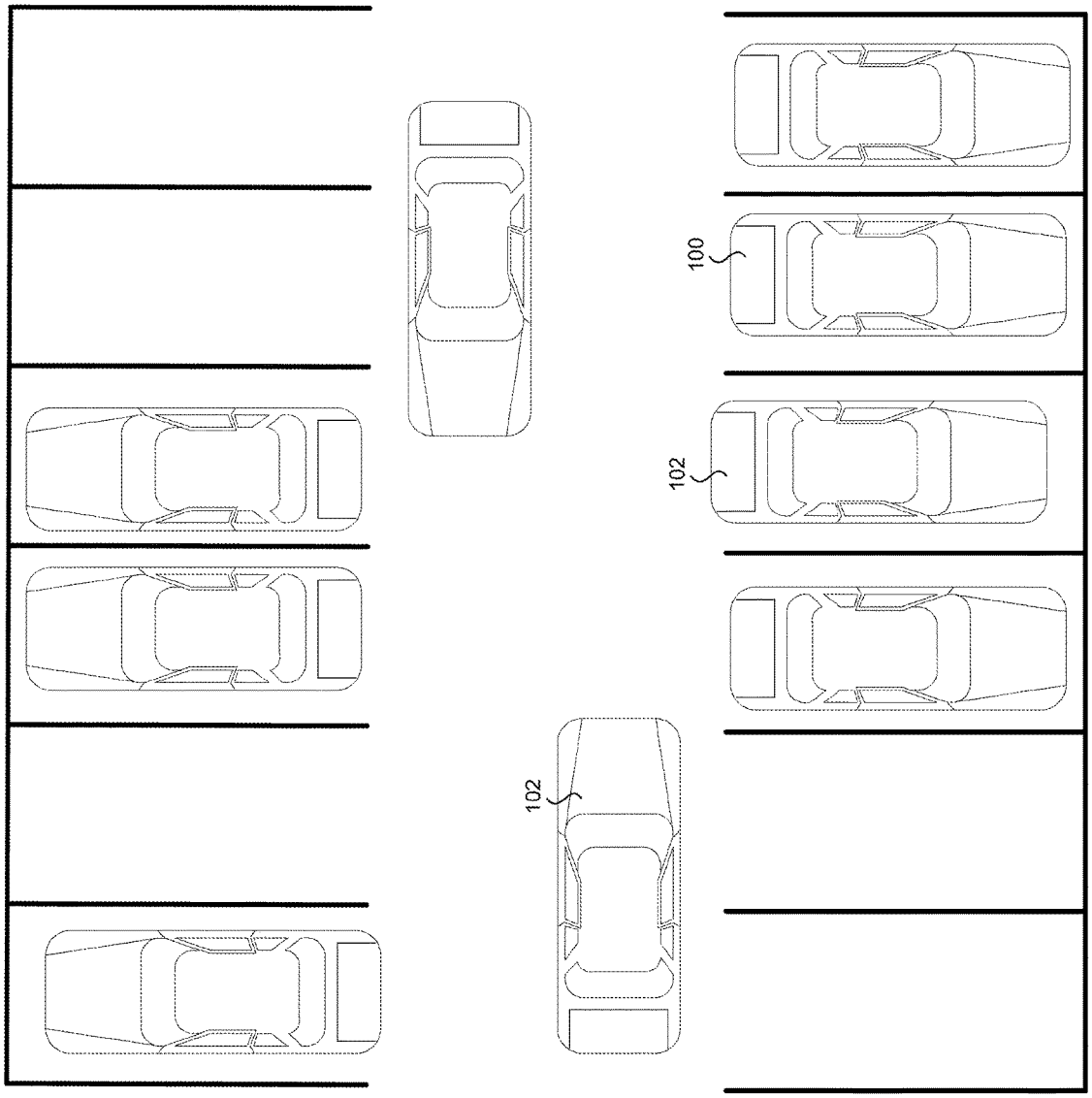
Figure 2A:
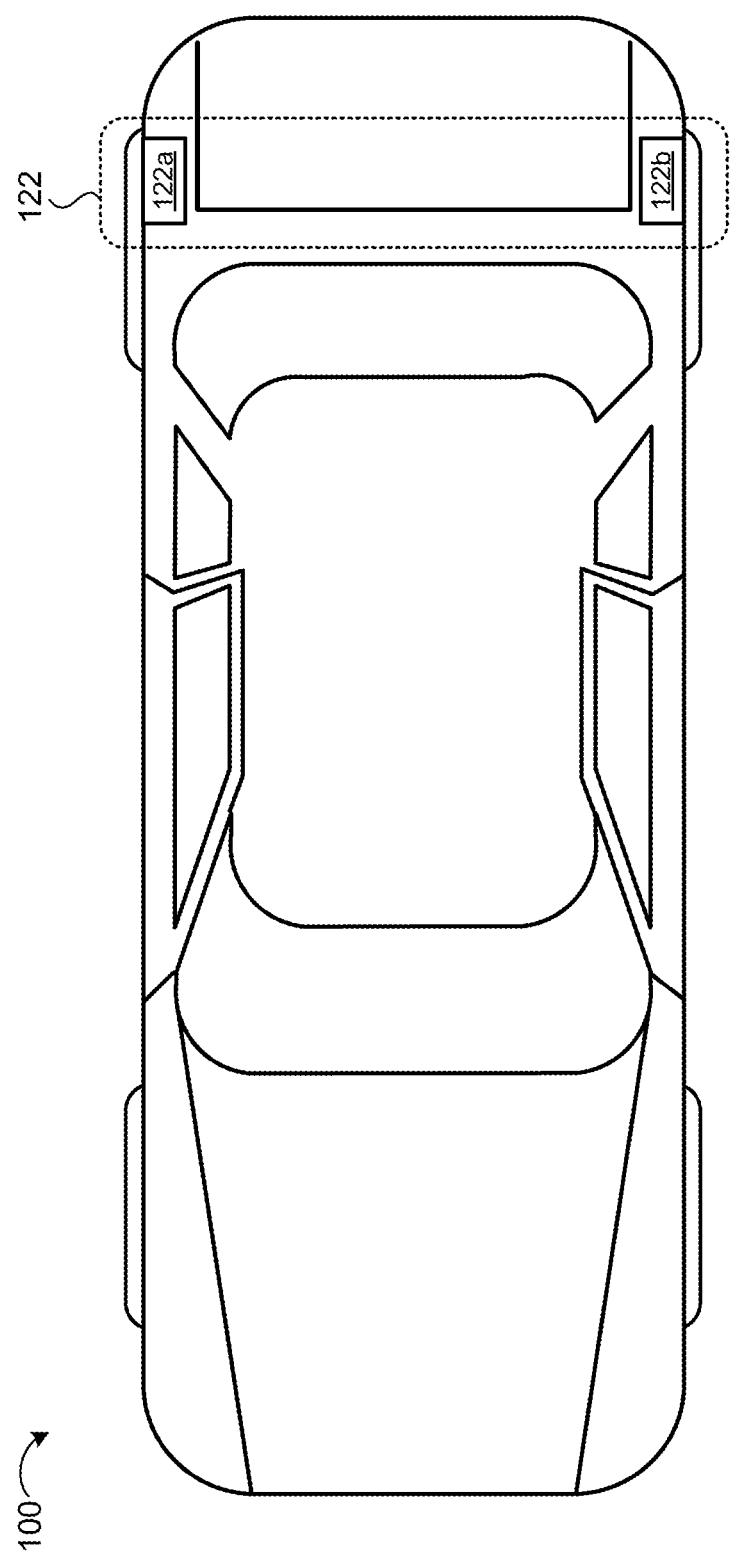
FIG. 2A is a schematic view of an exemplary overview of a vehicle having a blind spot monitoring system of the present invention.
Figure 2B:
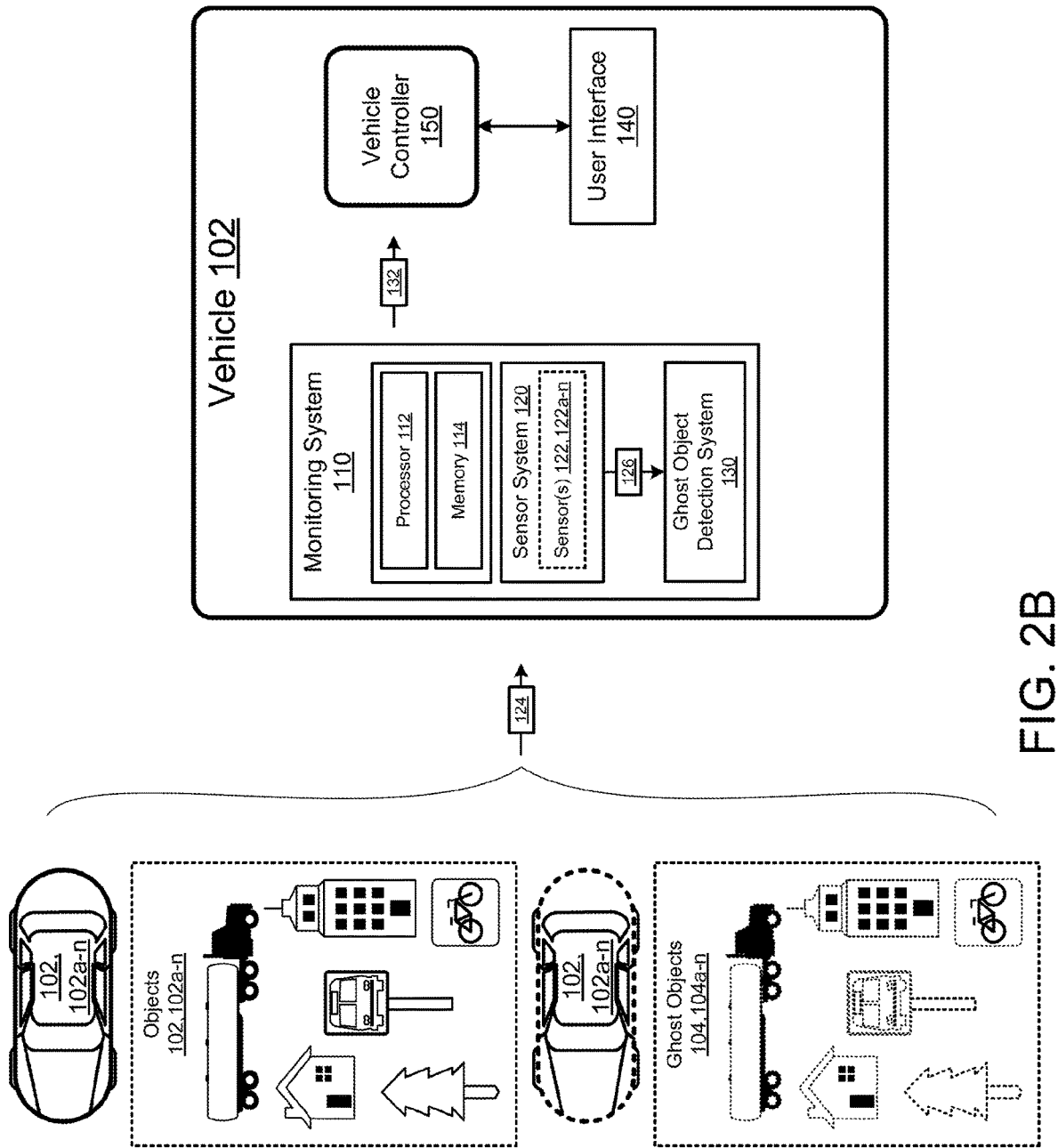
FIG. 2B is a schematic view of an exemplary blind spot monitoring system for the vehicle shown in FIG. 2A.

Advanced driver safety features have been gaining interest in the past few years. To increase transportation safety of vehicles, it is important to have an accurate idea of identifying objects that are proximate to and/or approaching a vehicle. This is particularly important for areas of the vehicle that are "blind spots" for the vehicle driver. This may include fields of view of the driver that are obstructed by the vehicle itself (traditionally labeled "blind spot") and areas that are obstructed by external objects, such as other vehicles, buildings, etc. that are proximate to the ego vehicle Referring to FIGS. 1A-5, a vehicle 100 includes a blind spot monitoring system 110 that includes a computing device (or hardware processor) 112 (e.g., central processing unit having one or more computing processors) in communication with non-transitory memory or hardware memory 114 (e.g., a hard disk, flash memory, random-access memory) capable of storing instructions executable on the computing processor(s) 112. The blind spot monitoring system 110 includes a sensor system 120. The sensor system 120 includes one or more sensors 122a-n positioned at one or more areas and configured to sense one or more objects 102, 102a-n in an area proximate to the vehicle. Objects 102, 102a-n may include, but are not limited to, vehicles 102a, traffic participants 102b, such as pedestrians and bicyclists, buildings/infrastructure 103b, natural objects, shrubbery, trees, etc. In addition to sensing actual objects 102, 102a-n the sensors 122, 122a-n may detect ghost objects as well. Ghost objects may be reflections that are sensed by the sensors 122, 122a-n. The blind spot monitoring system distinguishes the objects 102, 102a-n and the ghost objects 104, 104a-n from one another in the manner described herein.

In some implementations, sensors 122 may be short range radar sensors, which provide a broad field of view. The one or more sensors 122a-n may be positioned to capture data 124 associated with a specific area 10, where each sensor 122a-n captures data 124 associated with a portion of the area 10. As a result, the sensor data 124 associated with each sensor 122a-n includes sensor data 124 associated with the entire area 10. Alternatively, the sensors 122 may also include, but are not limited to, Sonar, LIDAR (Light Detection and Ranging, which can entail optical remote sensing that measures properties of scattered light to find range and/or other information of a distant target), HFL (High Flash LIDAR), LADAR (Laser Detection and Ranging), cameras (e.g., monocular camera, binocular camera).

Each sensor 122 is positioned at a location where the sensor 122 can capture sensor data 124 associated with objects 102, 102a-n, 104, 104a-n within their field of view. Therefore, the sensor system 120 analyses the sensor data 124 captured by the one or more sensors 122a-n. The analysis of the sensor data 124 includes the sensor system 120 identifying one or more objects 102, 102a-n, 104, 104a-n and determining whether it is an objects 102, 102a-n or a ghost object 104, 104a-n.

Based on general analysis, there are five types of multipath reflections are observed in a large amount of test data. In FIGS. 3A-E and 4, R is radar, T is real target, G is ghost object, S is the stationary object which has high reflection index, like parked car, truck or metal guard rail, or reflective wall. Double line arrow means the radar signal passes twice and single line arrow means radar signal passes once.

In FIG. 3A, the radar signal sends out from R, hits a stationary object S, and then reflected out and hit real target T, after that, the signal passes to S and then to R. The name of this figure is RSTSR and it stands for the path of the radar signal.

In FIG. 3B, the radar signal sends out from R, hits a real target T, then hit a stationary object S, after that it goes back to radar with the same path. It is called RTSTR.

In FIG. 3C, the radar signal R bounced twice between the real target T and the stationary object S. It is called RTSTSTR.

In FIG. 3D, the signal is sent out from radar, reflected by the target T and then by the stationary object S and return to the radar R finally. It is called RTSR.

In FIG. 3E, the signal is sent out from radar R, reflected by the stationary object S, then by the target T and return to radar. It is called RSTR.

In FIGS. 3A and 3B, we have:

$$y = z \qquad (1)$$

x, y and z stand for distances from radar, real object, ghost object and reflective stationary object.

In FIG. 3C, we have:

$$y = 0.5 * z \qquad (2)$$

In FIG. 3D, we have:

$$(x+z)*2 = r_t + y + x$$

$$x + z = r_g$$

$r_t$ is the range of the real target. $r_g$ is the range of the ghost object. It can be converted to:

$$y = 2r_g - r_t - x \qquad (3)$$

In FIG. 3E, we have:

$$x + y + r_s = 2(x + z)$$

$$x + z = r_g$$

We can conclude:

$$y = 2r_g - r_s - x \qquad (4)$$

$r_s$ is the range of the stationary object.

These five cases are different, and these objects will never satisfy more than one condition. 0.5z cannot equal to z if z is not zero. For equation (3), we have:

$$x+y>r_t$$

$$2x+2y>x+y+r_t$$

$$2x+2y>2z+2x$$

$$y>z$$

We can get similar conclusion for equation (4). So there will be only one condition be satisfied. Therefore, we can summarize equation (1) to (4):

$$y = \begin{cases} z \\ 0.5z \\ 2r_g - r_t - x \\ 2r_g - r_s - x \end{cases} \quad (5)$$

In FIG. 3A-E, there are always three objects, one real object, one ghost object and a stationary object. Two of them and radar sensor are colinear. One of them are not on the line formed by other two objects with radar.

Figure 4:
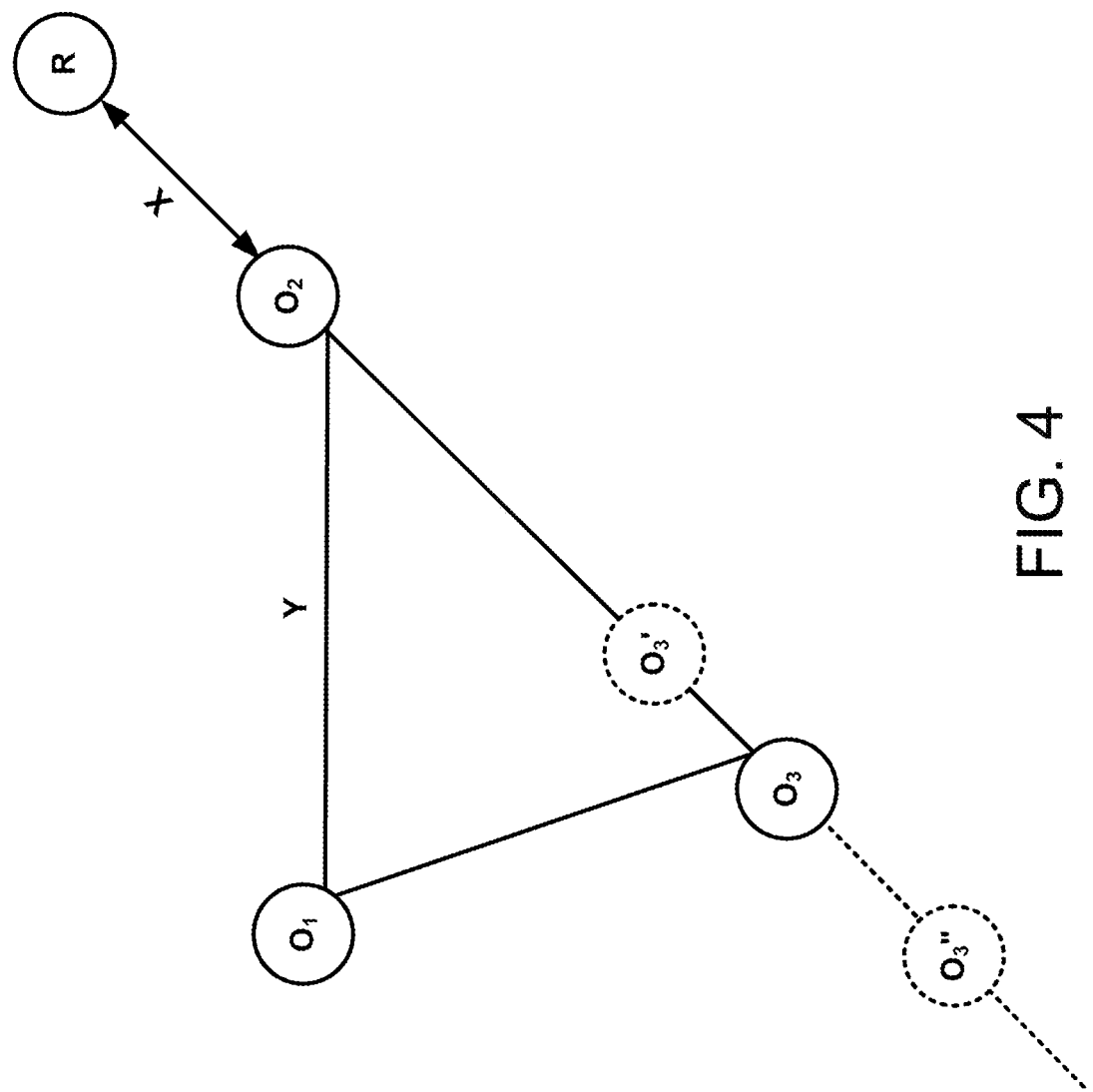
FIG. 4 is schematic view of a generalized model for ghost object detection with the blind spot monitoring system shown in FIGS. 1A-2B.

The five reflection cases can be generalized to be one situation as shown in FIG. 4. R is the radar sensor, $O_1$ and $O_2$ are two objects, $O_3$ or $O_3'$ or $O_3''$ is the third object. We can always form a triangle having two edges with the same length. Two objects ($O_1$ and $O_2$) are at two corners of the triangle. Length of edge $O_1O_2$ equals that of edge $O_2O_3$. The remain object is on the edge $O_2O_3$, but the location could be $O_3$, $O_3'$ or $O_3''$.

In detail, for reflection cases shown in FIG. 3A, $O_1$ is the real target, $O_2$ is the stationary object and $O_3$ is the ghost object. For the case shown in FIG. 3B, $O_1$ is the stationary target, $O_2$ is the real object and $O_3$ is the ghost object. For reflection case shown in FIG. 3C, $O_1$ is the stationary object, $O_2$ is the real target. $O_3'$ is the ghost object. $O_2$ is the middle point of $O_2O_3$ and $|O_2O_3|$ is $0.5|O_2O_3''|$. For reflection case shown in FIG. 3D, $O_3'$ will be the ghost object, $O_1$ is the real object and $O_2$ is the stationary object. The length of $O_2O_3$ edge of triangle $O_1O_2O_3$ will be $2r_g-r_t-x$, which can be written as $2RO_3'-RO_1-RO_2$. For reflection case shown in FIG. 3E, $O_1$ is the stationary object. $O_3'$ is ghost object and $O_2$ is the real target. The length of $O_2O_3$ of triangle $O_1O_2O_3$ will be $2r_g-r_s-x$, which can be also written as $2RO_3'-RO_1-RO_2$. Then formula will be:

$$O_1O_2 = O_2O_3 = \begin{cases} O_2O_3 \\ 0.5O_2O_3'' \\ 2RO_3' - RO_1 - RO_2 \end{cases} \quad (6)$$

Based on equation (6), a generalized solution as shown in FIG. 4 is provided to identify ghost object. This solution could be easily implemented to identify ghost object generated from all cases shown in FIG. 3A-E.

Figure 5:
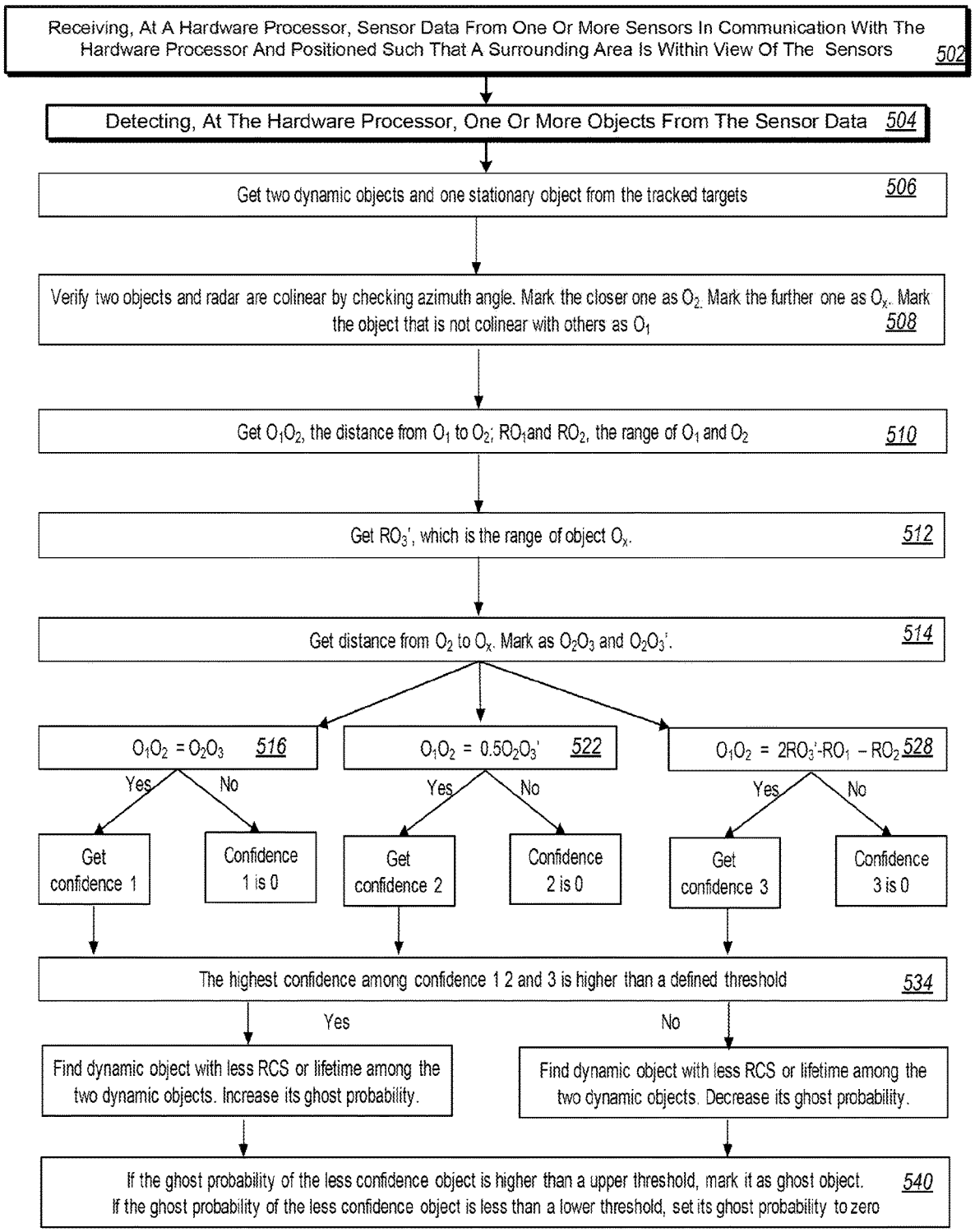
FIG. 5 is an example method for detecting ghost objects with the blind spot monitoring system shown in FIGS. 1A-2B.

FIG. 5 provides an example arrangement of operations for a method 500 for detecting a ghost object 104, 104a-n using the system 110 of FIGS. 1-4. At block 502, the method 500 includes receiving, at a hardware processor 112, sensor data 124 from one or more sensors 122 in communication with the hardware processor 112 and positioned such that the surrounding area 10 is within a field of view of the one or more sensors 122. At block 504, the method 500 includes detecting, at the hardware processor 112, one or more objects 102, 102a-n, 104, 104a-n from the sensor data 124. At block 506, the method 500 includes identifying, at the hardware processor 112, two dynamic objects and one stationary object from the one or more objects 102, 102a-n, 104, 104a-n.

Additionally, at block 508, the method 500 includes verifying, at the hardware processor 112, that two objects and radar are colinear by checking azimuth angle. Marking the closer one as $O_2$. Marking the further one as $O_x$. Marking the object that is not colinear with others as $O_1$.

At block 510, the method 500 includes determining, at the hardware processor 112, the distance from $O_1$ to $O_2$; $RO_1$ and $RO_2$, the range of $O_1$ and $O_2$. Further, at block 512, the method 500 includes determining, at the hardware processor 112, $RO_3'$, which is the range of object $O_x$. At block 514, the method 500 includes determining, at the hardware processor 112, the distance from $O_2$ to $O_x$ and marking as $O_2O_3$ and $O_2O_3'$.

At block 516, the method 500 includes comparing, at the hardware processor 112, whether $O_1O_2=O_2O_3$. Based on the comparison if $O_1O_2$ is equal to $O_2O_3$ a Confidence 1($C_1$) is obtained, at block 518 or $C_1$ is set to 0 if $O_1O_2$ is not equal to $O_2O_3$, at block 520.

At block 522, the method 500 includes comparing, at the hardware processor 112, whether $O_1O_2=0.5O_2O_3'$. Based on the comparison if $O_1O_2$ is equal to $0.5O_2O_3'$ a Confidence 2($C_2$) is obtained, at block 524 or $C_2$ is set to 0 if $O_1O_2$ is not equal $0.5O_2O_3'$, at block 526.

At block 528, the method 500 includes comparing, at the hardware processor 112, whether $O_1O_2=2RO_3'-RO_1-RO_2$. Based on the comparison if $O_1O_2$ is equal to $2RO_3'-RO_1-RO_2$ a Confidence 3 ($C_3$) is obtained, at block 530 or $C_3$ is set to 0 if $O_1O_2$ is not equal to $2RO_3'-RO_1-RO_2$, at block 532.

After $C_1$, $C_2$, and $C_3$ are obtained, the method 500 includes comparing, at the hardware processor 112, $C_1$, $C_2$, and $C_3$ to determine the highest confidence value among them then comparing the highest confidence to a pre-defined threshold, at block 534. If the highest confidence value is greater than the predefined threshold, the method 500 includes finding the dynamic object with less RCS or lifetime among the two dynamic objects and increasing the corresponding ghost probability, at block 536. If the highest confidence value is not greater than the predefined threshold, the method 500 includes finding the dynamic object with less RCS or lifetime among the two dynamic objects and decreasing the corresponding ghost probability, at block 538.

Further, at block 540, the method 500 includes comparing, at the hardware processor 112, whether the ghost probability of the less confidence object is higher than a upper threshold, and marking it as ghost object or whether the ghost probability of the less confidence object is less than a lower threshold, setting its ghost probability to zero.

Figure 6:
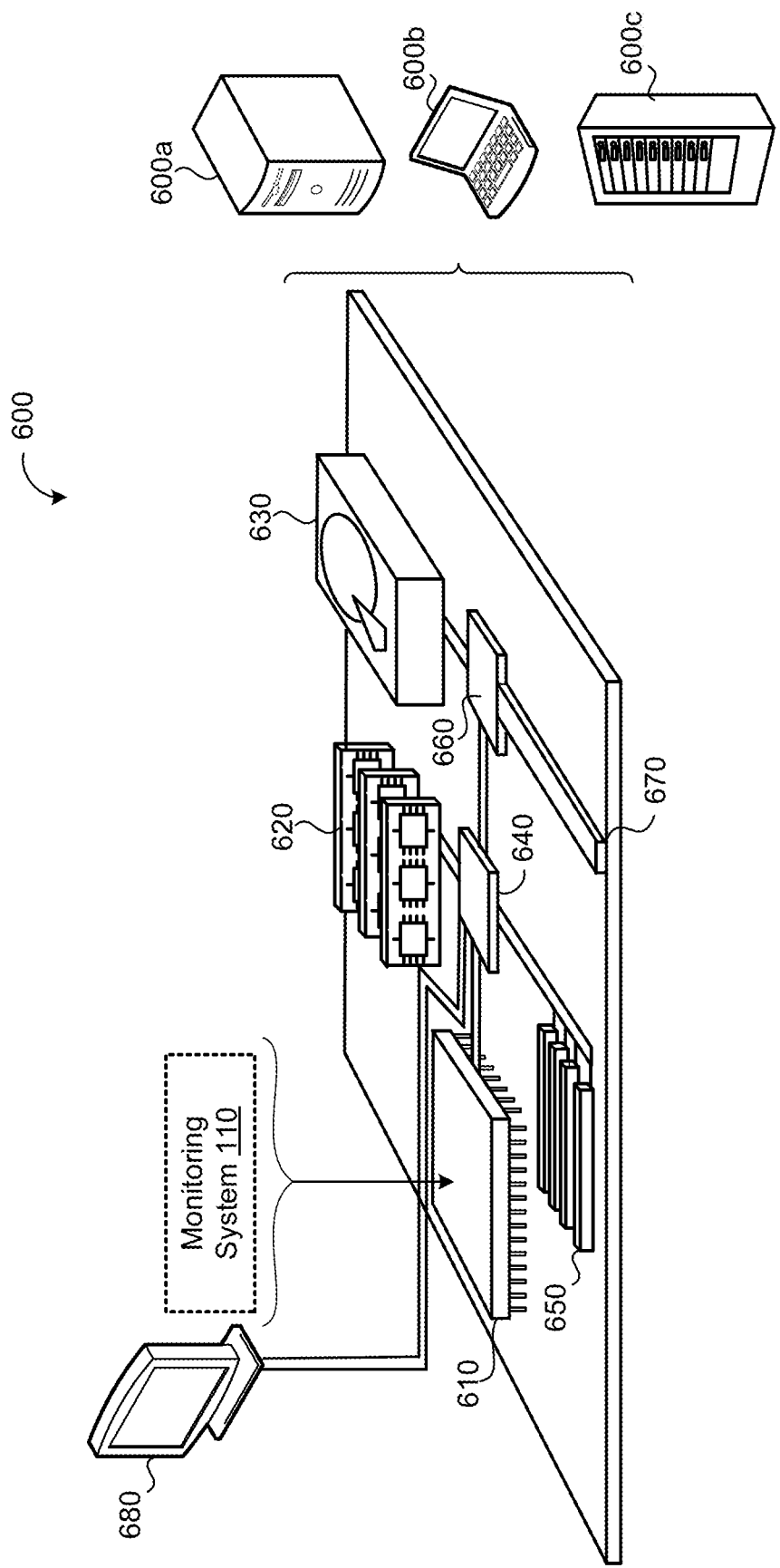
FIG. 6 is a schematic view of an example computing device executing any system or methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high-speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method classifying an object detected by a radar device, the method comprising:
   detecting a ghost object, a real object, and a reflective object from sensor data of the radar device;
   determining, from among the ghost object, the real object, and the reflective object, a first colinear object and a second colinear object that are colinear with the radar device based on an azimuth angle of the radar device, the first colinear device being closer in range to the radar device than the second colinear device;
   determining, from among the ghost object, the real object, and the reflective object, a non-colinear object that is not colinear with the radar device, the first colinear object, and the second colinear object based on the azimuth angle of the radar device;
   determining a first separation distance between the first colinear object to the second colinear object, a first range between the first colinear object and the radar device, and a second range between the second colinear object and the radar device;
   determining a second separation distance between the first colinear object and the non-colinear object and a third range between the non-colinear object and the radar device;
   determining whether the second separation distance is equal to: (i) the first separation distance, (ii) half the first separation distance, or (iii) twice the second range minus the first range and the third range; and
   identifying the ghost object at a location from the radar device based on a result of determining whether the second separation distance is equal to: (i) the first separation distance, (ii) half the first separation distance, or (ii) twice the second range minus the first range and the third range.

2. A radar device comprising:
   a hardware processor; and
   hardware memory in communication with the hardware processor, the hardware memory storing instructions that when executed on the hardware processor cause the hardware processor to perform operations comprising:
   detecting a ghost object, a real object, and a reflective object from sensor data of the radar device;
   determining, from among the ghost object, the real object, and the reflective object, a first colinear object and a second colinear object that are colinear with the radar device based on an azimuth angle of the radar device, the first colinear device being closer in range to the radar device than the second colinear device;
   determining, from among the ghost object, the real object, and the reflective object, a non-colinear object that is not colinear with the radar device, the first colinear object, and the second colinear object based on the azimuth angle of the radar device;
   determining a first separation distance between the first colinear object to the second colinear object, a first range between the first colinear object and the radar device, and a second range between the second colinear object and the radar device;
   determining a second separation distance between the first colinear object and the non-colinear object and a third range between the non-colinear object and the radar device;
   determining whether the second separation distance is equal to: (i) the first separation distance, (ii) half the first separation distance, or (iii) twice the second range minus the first range and the third range; and
   identifying the ghost object at a location from the radar device based on a result of determining whether the second separation distance is equal to: (i) the first separation distance, (ii) half the first separation distance, or (iii) twice the second range minus the first range and the third range.

* * * * *